Dec. 24, 1963     C. N. PAGANO     3,115,607
SYNCHRONIZED GATE
Filed July 2, 1958
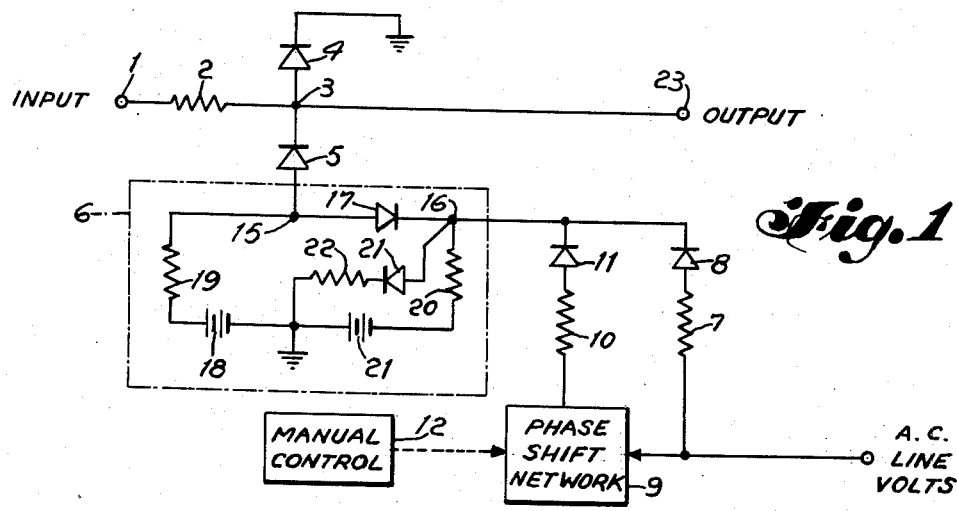
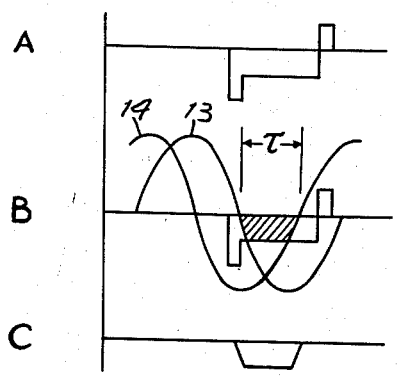
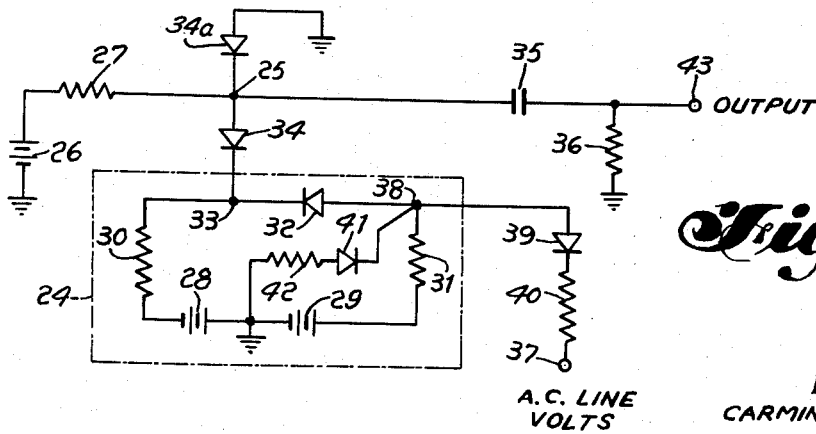
Inventor
CARMINE N. PAGANO
By Philip M. Bolton
Attorney

United States Patent Office 3,115,607
Patented Dec. 24, 1963

3,115,607
SYNCHRONIZED GATE
Carmine N. Pagano, Long Island City, N.Y., assignor to International Telephone and Telegraph Corporation, Nutley, N.J., a corporation of Maryland
Filed July 2, 1958, Ser. No. 746,531
5 Claims. (Cl. 328—91)

This invention relates to synchronized gates and particularly to an electrical gating circuit synchronized with A.C. line voltage.

In some instances where the output of two electrical signal choppers are summed, there occur spikes at each edge of the summation square wave. These spikes are caused by the different dwell time or phase lag of the square waves and must be removed before the summation square wave can be employed in other electrical systems. In many instances the choppers are driven by A.C. line voltage each producing chopped signals at the same frequency as the line voltage. Therefore, gating means for removing the spikes on the square wave summation of the outputs of the choppers may conveniently operate at line frequency.

Therefore, it is the principal object of this invention to provide a line frequency driven gate for gating a variable interval at line frequency.

It is another object to provide a simple diode gate controlled by line frequency signals for gating a variable interval at line frequency.

It is another object to provide a signal chopper driven by an A.C. line signal for chopping an input signal at line frequency.

It is another object to provide means for eliminating the spikes at each edge of a square wave which is formed by the summation of two square waves slightly out of phase.

It is the principal feature of this invention to employ unidiretcional conductive devices coupled to a line for providing a short circuit electrical path from that line to ground and to couple voltage dividing means to at least one of said diodes having gating signals applied thereto so that said diodes conduct and provide a short circuit path to ground for signals in said line in response to said gating signals.

It is a feature of one embodiment of this invention to employ A.C. line signals of different phase as said gating signals and it is a feature of another embodiment of this invention to employ a single A.C. line signal as said gating signals to chop an input signal.

Other and furhter features will be more apparent from the following specific description of embodiments of this invention taken in conjunction with the figures, in which:

FIG. 1 depicts a controlled gating circuit for gating variable intervals at line frequency;

FIG. 2 depicts waveforms from which to gain an understanding of the operation of the gating circuit shown in FIG. 1; and FIG. 3 depicts a gating circuit for chopping a D.C. input signal at the frequency of A.C. line voltage.

Turning first to FIG. 1, there is shown an input terminal 1 fed a signal which may be, for example, as shown in waveform A of FIG. 2, and which might result from the summation of positive and negative square waves which are slightly out of phase. Terminal 1 feeds resistor 2 which in turn is coupled to junction 3 having two diodes 4 and 5 coupled thereto; one diode 4 coupled to and electrically directed towards ground and the other diode 5 electrically coupled to and directed away from voltage divider 6. Voltage divider 6 is controlled by A.C. line signals of different phase, one being fed via resistor 7 and diode 8 to the voltage divider and the other being fed via phase shift network 9, resistor 10 and diode 11 to the voltage divider. Phase shift network 9 may impose a fixed phase shift to the A.C. line voltage fed to it or it may be controlled by, for example, a manual control such as manual control 12 mechanically or otherwise, coupled thereto so that the phase shift may be varied.

Voltage divider 6 includes a resistor 19 and battery 18 connected in series between point 15 and ground, a diode 17, resistor 20 and a battery 21 connected in series relation between junction 15 and ground potential, and diode 21 and resistor 22 connected between junction 16 and ground.

The operation of the gate circuit of this invention can be described as follows. With no alternating current line voltage input, in the form of sine waves, there will be no output from diodes 8 and 11. Under this condition diode 21 will be nonconductive, point 16 will assume the potential of battery 21, and point 15 will assume the potential of battery 18. With resistor 20 and battery 21 and resistor 19 and battery 18 having proper selected values, point 15 will be more positive than point 16, thereby rendering diode 17 conductive. Under conduction of diode 17 the potential at 15 will drop in value and become more negative than point 3 due to the IR drop in resistor 19, thereby maintaining diode 5 in its normal cut-off or nonconducting condition. It should be remembered that point 3 has the value of the input signal as illustrated in curve A, FIG. 2. Likewise, diode 4 will be maintained nonconductive since point 3 is more negative than the ground potential coupled to the cathode of diode 4.

Let us assume now that line voltage is applied to its input terminal and that sine wave 14, curve B, FIG. 2, is in its negative excursion, and sine wave 13 has just reached or barely passed the horizontal reference line of curve B. This will mean that both signals 13 and 14 are negative and diodes 8 and 11 will both be rendered nonconductive. Thus, under these conditions the conduction conditions of the various diodes and the potentials of the various points in voltage divider 6 will be maintaned as descrbed above when there was no line voltage input.

Having established the condition of voltage divider 6, when there is no output from diodes 8 and 11, we will now turn to the situation when one of the sine waves 13 and 14 increases in value to be equal to or slightly greater than the potential at point 16. When this condition is reached, one of the diodes 8 and 11 will become conductive and will apply a more positive potential at point 16 of sufficient value to cause diode 17 to become nonconductive and diode 21 to become conductive to clamp point 16 to ground potential. When diode 17 becomes nonconductive, point 15 will have a potential equal to the potential of battery 18 which is more positive than the potential at point 3, this being the magnitude of the input signal. Thus, diode 5 becomes conductive which in turn will cause diode 4 to become conductve to thereby short circuit the remaining input signal to ground.

Diode 21 and resistor 22, as mentioned hereinabove, clamps junction 16 to ground when diode 17 is nonconductive. This prevents further excursion of the control signals from causing the potential at junction 15 to increase.

With diode 4 poled, as illustrated, if junction 3 swings positive due to the polarity and magnitude of the input signal, diode 4 will be rendered conductive, thereby providing a short circuit to ground for positive input signals even when voltage divider 6 is in its normal condition of maintaining diode 5 nonconductive.

In view of the operation of voltage divider 6 under control of the sine wave signals impressed thereupon, a signal, such as illustrated in waveform A, FIG. 2, applied to input terminal 1 emerges at output terminal 23 as shown in waveform C, when sine wave signals, such as 13 and 14, are applied to resistors 7 and 10, respectively.

Turning next to FIG. 3, there is shown another embodiment of this invention which operates in a manner similar to the embodiment shown in FIG. 1. In FIG. 3 there is shown a slightly different voltage divider 24 having a single input control signal which is an A.C. line voltage signal and serves to chop a D.C. signal applied to a junction 25 from battery 26 via resistor 27. Batteries 28 and 29 and resistors 30 and 31 of voltage divider 24 are such that diode 32 conducts maintaining junction 33 more positive than junction 25, thereby blocking a short circuit path from battery 26 through resistor 27 to junction 25 through diode 34 to junction 33 and thence through resistor 30 to battery 28; thus, no change in the potential at junction 25 occurs and thus no signal is applied via capacitance 35 to output resistor 36.

The above operation of voltage divider 24 occurs when the A.C. line voltage signal applied to terminal 37 swings more positive than junction 38 of the voltage divider. On the other hand, when the A.C. line voltage applied to terminal 37 swings lower a circuit is opened from battery 29 via resistor 31 to diode 39 to resistor 40 and thence to terminal 37, thereby decreasing the voltage at junction 38 due to the greater current and voltage drop in resistor 31. When the voltage at junction 38 decreases sufficiently diode 32 stops conducting, the potential at junction 33 decreases and diode 34 conducts opening a conduction path from battery 28 through resistor 30 and diodes 34 and 34a to ground, causing a decrease in voltage at junction 25 which is applied via condenser 35 discharging through resistor 36 yielding an output signal. Diode 41 and resistor 42 coupling junction 38 to ground are provided to clamp junction 38 to ground so that excursions of A.C. line voltage applied to terminal 37, more negative than a predetermined level will not cause the voltage at junction 38 to drop excessively.

Obviously, by the proper choice of components shown in FIG. 3 and the proper choice of A.C. line voltage applied to terminal 37, a chopped D.C. signal of a given duration and amplitude and at A.C. line frequency can be produced at the output terminal 43 and thus the circuit shown in FIG. 3 acts as a chopper to chop the D.C. signal from battery 26.

While there is shown in the several figures of the drawings different embodiments of this invention, the principles and circuits disclosed herein may be applied to systems different from those illustrated without departing from the spirit or scope of the invention as defined in the claims.

I claim:

1. A device for controlling conduction of a given signal between an input means and an output means comprising:
    input means;
    a source of said given signal coupled to said input means;
    output means connected directly to said input means;
    a first diode having one electrode connected directly to ground and the other electrode coupled to the junction between said input means and said output means;
    a second diode having one electrode coupled to said junction in a series aiding relation with said first diode;
    controllable voltage means coupled to the other electrode of said second diode to normally maintain said first and second diodes in nonconducting condition;
    a source of at least one sine wave signal; and
    means coupled between said voltage means and said sine wave signal source to controllably couple said sine wave signal to said voltage means to maintain said first and second diodes nonconducting during a predetermined portion of a cycle of said sine wave signal to permit conduction of said given signal to said output means during said predetermined portion and to render said first and second diodes conductive during other portions of a cycle of said sine wave signal to prevent conduction of said given signal to said output means during said other portions.

2. A device for gating a given signal having a given polarity and a given repetition rate comprising:
    a source of said given signal;
    an output means connected directly to said source;
    a first diode having one electrode connected directly to ground and the other electrode coupled to the junction between said source and said output means;
    a second diode having one electrode coupled to said junction in a series aiding relation with said first diode;
    controllable voltage means coupled to the other electrode of said second diode to normally maintain said first and second diodes in a nonconducting condition;
    means for generating two sine wave signals phase displaced with respect to each other, each having a frequency related to said given repetition rate; and
    means coupled between said voltage means and said generating means to controllably couple said sine wave signals to said voltage means to maintain said first and second diodes nonconducting when both of said sine wave signals have a polarity equal to said given polarity to permit conduction of said given signal to said output means and to render said first and second diodes conductive when either of said sine wave signals have a polarity opposite to said given polarity to prevent conduction of said given signal to said output means.

3. A device for gating a given negative signal having a given repetition rate comprising:
    a source of said given signal;
    an output means connected directly to said source;
    a first diode having its cathode connected directly to ground and its anode coupled to the junction between said source and said output means;
    a second diode having its cathode coupled to said junction;
    a controllable voltage means coupled to the anode of said second diode to normally maintain said first and second diodes in a nonconducting condition;
    means for generating two sine wave signals phase displaced with respect to each other, each having a predetermined frequency related to said given repetition rate; and
    means coupled between said voltage means and said generating means to controllably couple said sine wave signals to said voltage means to maintain said first and second diodes nonconducting when both of said sine wave signals have a negative polarity to permit conduction of said signal to said output means and to render said first and second diodes conductive when either of said sine wave signals have a positive polarity to prevent conduction of said given signal to said output means.

4. A device for gating a given signal having a given polarity and a given repetition rate comprising:
    a source of signal including said given signal and other signals;
    an output means connected directly to said source;
    a first diode having one electrode connected directly to ground and the other electrode coupled to the junction between said source and said output means, said first diode being poled to be conductive when the signal at said junction has a polarity opposite to said given polarity thereby shorting this signal to ground;
    a second diode having one electrode coupled to said junction in a series aiding relation with said first diode;
    controllable voltage means coupled to the other electrode of said second diode to normally maintain both said first and second diodes in a nonconducting condition;

means for generating two sine wave signals phase displaced with respect to each other, each having a frequency related to said given repetition rate; and means coupled between said voltage means and said generating means to controllably couple said sine wave signals to said voltage means to maintain both said first and second diodes nonconducting when both of said sine wave signals have a polarity equal to said given polarity to permit conduction of said given signal to said output means and to render said first and second diodes conductive when either of said sine wave signals have a polarity opposite to said given polarity to prevent conduction of said given signal to said output means.

5. An electrical signal chopper for chopping a direct current signal at given intervals comprising:

a source of direct current signal;

an output means connected directly to said source;

a first diode having one electrode connected directly to ground and the other electrode coupled to the junction between said source and said output means;

a second diode having one electrode coupled to said junction in a series aiding relation with said first diode;

controllable voltage means coupled to the other electrode of said second diode to normally maintain said first and second diodes in a nonconducting condition;

a source of sine wave signal having a given frequency related to said given intervals; and means coupled between said voltage means and said generating means to controllably couple said sine wave signal to said voltage means to maintain said first and second diodes nonconducting when said sine wave signal has a given polarity to permit conduction of said direct current signal to said output means and to render said first and second diodes conductive when said sine wave signal has a polarity opposite to said given polarity to prevent conduction of said direct current signal to said output means.

References Cited in the file of this patent

UNITED STATES PATENTS

| | | |
|---|---|---|
| 2,486,789 | Lakatos | Nov. 1, 1949 |
| 2,597,796 | Hindall | May 20, 1952 |
| 2,625,662 | Gaynor et al. | Jan. 13, 1953 |
| 2,723,355 | Graham | Nov. 8, 1955 |
| 2,761,130 | Kibler | Aug. 28, 1956 |
| 2,827,573 | Eckert | Mar. 18, 1958 |
| 2,829,251 | Patton | Apr. 1, 1958 |
| 2,851,617 | Walker | Sept. 9, 1958 |
| 2,856,526 | Merrill | Oct. 14, 1958 |
| 2,862,104 | Summers | Nov. 25, 1958 |
| 2,868,969 | Inniss | Jan. 13, 1959 |
| 2,877,416 | Grisdale | Mar. 10, 1959 |
| 2,894,130 | Martin | July 7, 1959 |
| 2,924,723 | Van Overbeek | Feb. 9, 1960 |
| 2,930,987 | Groce et al. | Mar. 29, 1960 |

FOREIGN PATENTS

| | | |
|---|---|---|
| 719,785 | Great Britain | Dec. 8, 1954 |

OTHER REFERENCES

Millman et al.: Pulse and Digital Circuits, 1956, McGraw-Hill, (page 455 relied on).

Mather: Electronics, July 1947, page 111.